United States Patent [19]

Harris

[11] 4,023,419

[45] May 17, 1977

[54] MECHANISM FOR COIN-OPERATED TIMER RUN TIME ACCUMULATOR

[75] Inventor: Robert D. Harris, Louisville, Ky.

[73] Assignee: General Electric Company, Louisville, Ky.

[22] Filed: Mar. 8, 1976

[21] Appl. No.: 664,665

Related U.S. Application Data

[63] Continuation of Ser. No. 490,558, July 22, 1974, abandoned.

[52] U.S. Cl. .................... 74/30; 194/92

[51] Int. Cl.² .................... F16H 19/04

[58] Field of Search .................... 194/92; 74/30

[56] References Cited

UNITED STATES PATENTS

| | | | |
|---|---|---|---|
| 2,427,396 | 9/1947 | Farny | 194/92 |
| 3,106,278 | 10/1963 | Hall | 194/92 |
| 3,576,137 | 4/1971 | Zinninger | 194/92 |
| 3,605,509 | 9/1971 | Harris, Sr. | 194/92 |

*Primary Examiner*—Samuel Scott
*Assistant Examiner*—Wesley S. Ratliff, Jr.
*Attorney, Agent, or Firm*—Frederick P. Weidner; Francis H. Boos

[57] ABSTRACT

A mechanism is provided for use in conjunction with a time accumulating means adapted to accumulate timer run time on a timer mechanism in response to an outward reciprocation of the slide of a coin-receiving mechanism from a fully inward position. The mechanism is associated with the slide and provides for positively stopping inward movement of a gear rack used to set the timer run time and includes resilient means to take up any deviation in mechanism assembly tolerance thereafter without further inward movement of the gear rack.

6 Claims, 5 Drawing Figures

MECHANISM FOR COIN-OPERATED TIMER RUN TIME ACCUMULATOR

CROSS REFERENCE TO RELATED APPLICATION

This is a continuation of copending application Ser. No. 490,558 filed July 22, 1974, now abandoned.

BACKGROUND OF THE INVENTION

1. Field of the Invention

This invention relates generally to coin-operated timers such as may be used to control laundry machines, and more specifically, to a mechanism for an improved coin-operated time accumulator particularly adapted for use on automatic laundry machines.

2. Description of the Prior Art

In U. S. Pat. No. 3,576,137 to Zinninger assigned to the same assignee of the instant invention, means are described for accumulating timer run time by the sequential introduction of a series of coins in a coin-receiving mechanism. The coin-receiving mechanism employed by Zinninger is of a type commonly available, the structure and operation of which is well known to those skilled in the art. Such coin-receiving mechanisms commonly incorporate an inwardly and outwardly reciprocal slide biased toward the outward position, and have various assemblies adapted to receive, evaluate and collect coins and to restrict the reciprocation of the slide in the event of inadequate or improper coinage deposit. Included within the group of such assemblies is a movement restricting means operable after an initial amount of outward reciprocation of the slide from the fully inward position to prevent subsequent inward reciprocation of the slide. A problem arises in conjunction with a time accumulating means such as disclosed by Zinninger when employed in conjunction with such commonly available coin-receiving mechanisms in that an unscrupulous operator may accumulate unauthorized timer run time by repeatedly reciprocating or ratcheting the slide inwardly and outwardly in small increments when the slide is near its fully inward position. To solve this problem U.S. Pat. No. 3,605,509 to Harris assigned to the assignee of the instant invention was issued relating to a lost motion mechanism associated with the slide to delay the operation of the time accumulating means during the initial outward reciprocating of the slide until the movement restricting means became operable to prevent subsequent inward reciprocation of the slide and thereby also preventing rotation of the timer gear during the initial outward reciprocation of the slide.

A problem, however, arises in conjunction with a time accumulating means similar to the mechanism disclosed in U.S. Pat. Nos. 3,576,137 and 3,605,509. The problem again is that operators of the machine may also accumulate unauthorized timer run time by forcibly ramming the slide and the rack it carries inwardly with such force that it will cause the rack to be carried further inwardly by the momentum thereof. In this manner then the outwardly withdrawal of the slide carrying the rack will register more timer run time than would normally be accumulated for a given amount of coinage. It is therefore one object of the present invention to provide a means for preventing the unauthorized accumulation of timer run time on coin-operated timer mechanisms.

Such coin-operated timer mechanisms as described above suffer in accuracy due to the difference in mechanism assembly tolerances that will vary from one slide mechanism to another. Heretofore each individual machine needed to be adjusted manually to compensate for the manufacturing tolerance differences to assure uniformity of time accumulation from one machine to another. It is therefore another object of this invention to provide for a self-compensating assembly tolerance adjustment to automatically compensate for tolerance differences from one assembly to another and arrive at a constant accumulator time period per setting.

SUMMARY OF THE INVENTION

There is provided a time accumulating means adapted to accumulate timer run time on a timer mechanism in response to an outward reciprocation of the slide of a coin receiving mechanism from a fully inward position wherein the time accumulating means rotates a setting shaft of a timer mechanism unidirectionally in response to an inward and outward reciprocation of the slide. The timer accumulating means includes a gear rack associated with a slide for reciprocation therewith, a gear rotatably positioned to engage the gear rack during at least a portion of the outward reciprocation, and a unidirectional clutch connecting the gear and the timer setting shaft.

This invention relates to utilizing in such a time accumulating mechanism means to positively stop inward movement of the gear rack at a predetermined position relative to the timer gear and resilient means to take up mechanism assembly tolerances without further inward movement of the gear rack.

DESCRIPTION OF THE PREFERRED EMBODIMENT

Figure 1:
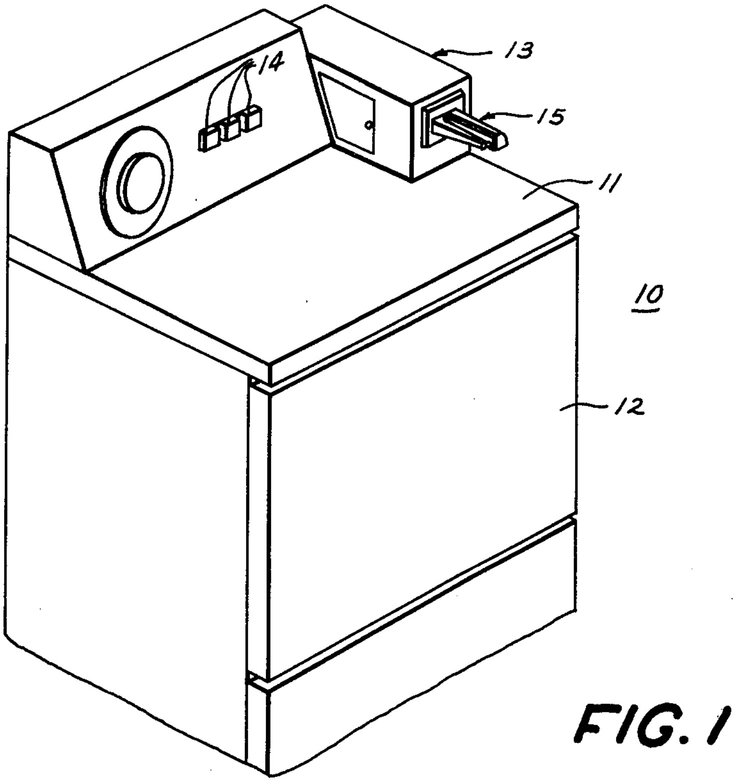
FIG. 1 is a perspective view of a clothes dryer incorporating the invention.

Referring now to the drawings, and initially to FIG. 1 thereof, there is illustrated a laundry machine, such as an automatic clothes dryer 10 having a suitable appearance and protective outer cabinet 11 with a service access door 12 pivotally mounted thereon for providing entry to the interior of the cabinet 11. The cabinet 11 also supports a coin-operated mechanism 13 adapted to initiate and control the operation of the dryer 10 in response to the selection of a drying cycle by means of control buttons 14 and the introduction of appropriate coinage through a coin-receiving mechanism 15.

Figure 2:
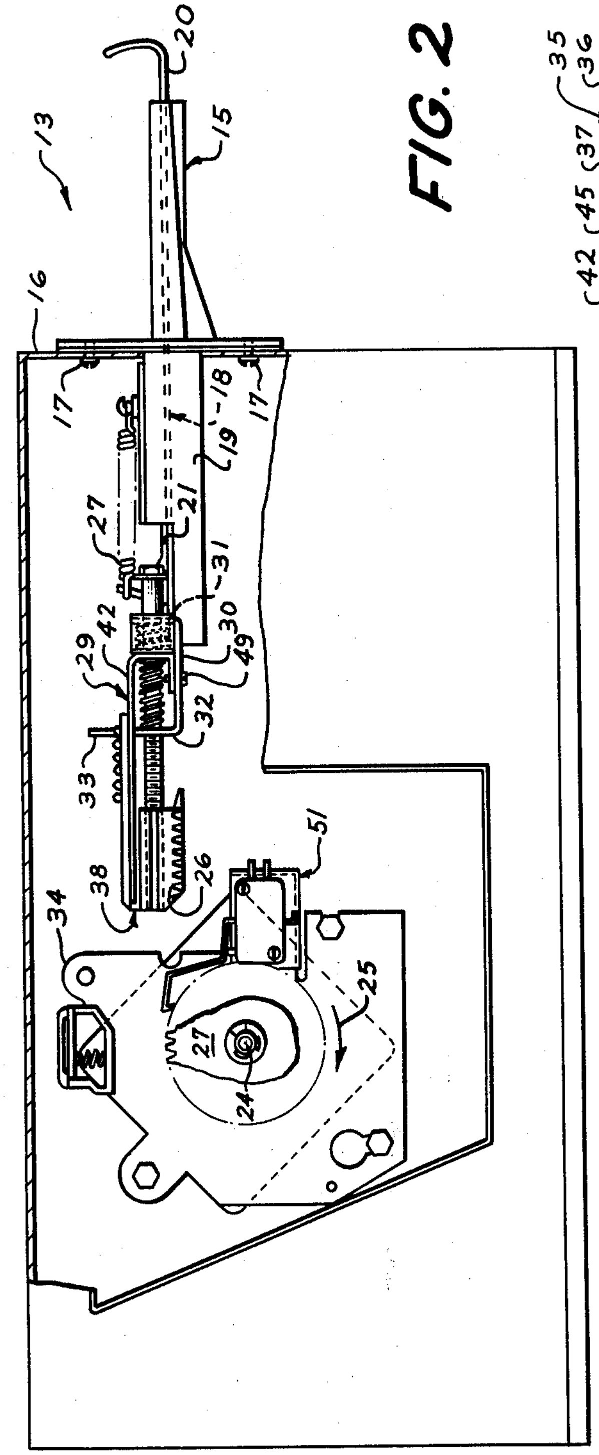
FIG. 2 is a side elevational view partly in section illustrating various details of the invention mechanism with the slide of the coin receiving mechanism extended fully outwardly.
Figure 3:
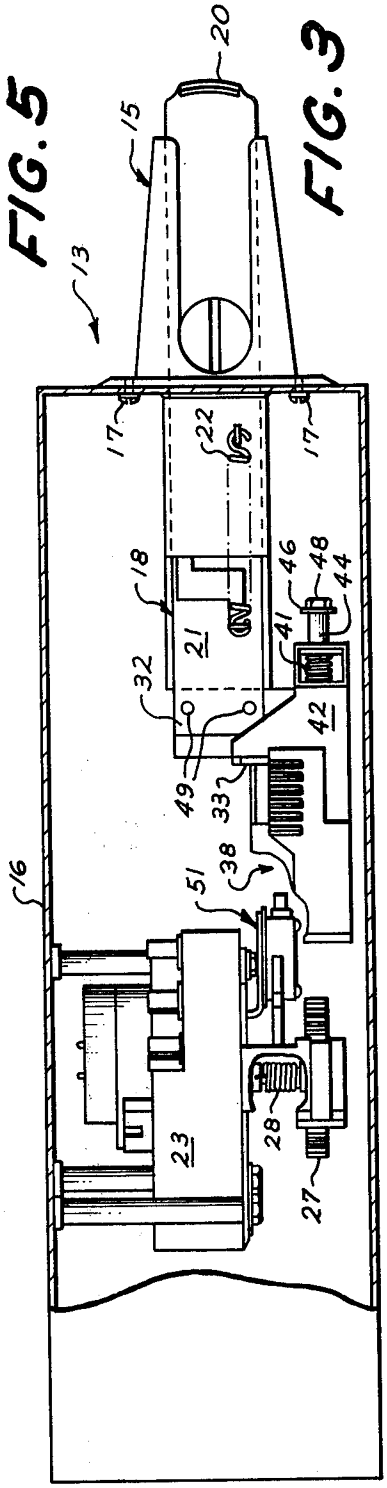
FIG. 3 is a top plan view partly in section showing the embodiment of FIG. 2.

In FIGS. 2 and 3 it may be seen that coin-operated mechanism 13 comprises a rigid housing 16 having coin-receiving mechanism 15 secured to an end wall thereof by means of suitable fasteners 17. The details of coin-receiving mechanism 15 do not form a part of the instant invention and are well known in the art. In brief, such mechanisms comprises a slide 18 reciprocally mounted in a slide housing 19, the slide 18 having an outward end 20 accessible outside the housing and adapted to be moved manually by an operator and an inward end 21 adapted for mounting appropriate operational mechanisms thereon. A spring 22 operates between slide 18 and slide housing 19 to bias slide 18 outwardly. Included in the coin-receiving mechanism 15 are various assemblies (not shown) adapted to receive, evaluate and collect coins, and to restrict the reciprocation of slide 18 in the event of inadequate or improper coinage deposit.

A timer mechanism 23 is supported by the rigid housing 16 and has a setting shaft 24 extending outwardly therefrom. Included within timer mechanism 23 are a series of cam operated switches provided to control the program of dryer 10. The timer mechanism 23 is so internally wired that when setting shaft 24 reaches a particular angular position, power to the motor of the timer mechanism is interrupted. To restart the timer mechanism, it is necessary to advance the timer setting shaft 24 in the direction of arrow 25. Such rotation of setting shaft in the direction of arrow 25 causes an accumulation of timer run time proportional to the amount of rotation of the setting shaft. When the desired amount of timer run time has been set by rotating setting shaft 24 in the direction of arrow 25, the motor of the timer mechanism will cause a return rotation of the setting shaft in the direction opposite arrow 25 until the shaft 24 reaches the angular position wherein the timer mechanism motor power is internally interrupted.

A member 38 including gear rack 26 is secured to slide 18 for reciprocation therewith, and a gear 27 is rotatably positioned to engage the gear rack 26. Gear 27 is selectively coupled to timer-setting shaft 24 by a unidirectional clutch generally indicated by the numeral 28. It is the function of unidirectional clutch 28 to couple setting shaft 24 to gear 27 for rotation therewith only when gear 27 is rotated in the direction of arrow 25. By this arrangement, when slide 18 with member 38 and gear rack 26 are reciprocated inwardly, gear rack 26 will cause rotation of gear 27, but clutch 28 will assure no reverse rotation of timer-setting shaft 24 and hence no loss of timer run time accumulated thereon. When, however, slide 18 is moved fully outwardly from a fully inward position, gear rack 26 will cause a predetermined rotation of gear 27 in the direction of arrow 25, and hence the addition or accumulation of a predetermined amount of timer run time. To prevent any possible energization of the timer motor a trip switch assembly 52 is provided so that engagement with the gear rack 26 cuts off all electricity to the timer motor until the gear rack passes.

It has been found to be more desirable to rotate timer setting shaft 24 for accumulation of timer run time thereon during the outward reciprocation of slide 18, than during the inward reciprocation of the slide, as a greater degree of accuracy and time accumulation is achieved. Such greater accuracy is achieved because, by initiating the rotation of setting shaft 24 with gear rack 26 and slide 18 in the fully inward position, gear rack 26 and gear 27 are fully meshed and rotation of shaft 24 continues until gear rack 26 and gear 27 become disengaged. This is to be compared with the less accurate alternative of initiating rotation of shaft 24 on the inward stroke of slide 18 at such time as gear rack 26 and gear 27 become meshed. As no initial meshing relationship necessarily exists between gear rack 26 and 27, the initiation of rotation of shaft 24 may occur earlier or later than is required for the accurate accumulation of timer run time.

Such an arrangement as described above does not, however, prevent the unauthorized accumulation of timer run time during the above mentioned period of inward reciprocation of the slide when it is pushed inwardly with great force. The momentum of the slide and rack during such movement carries the rack further inwardly than it should be when so moved in the prior art mechanisms described previously. This means of course that the outward reciprocation of the slide 18 from the fully inward position will rotate gear 27 and the setting shaft a further distance thus accumulating a greater period of time. One of the purposes of my invention is to prevent such unauthorized accumulation of timer run time due to that deficiency in the prior art mechanisms.

Gear rack 27 is supported from the slide end 21 by means of a lost motion mechanism 29. It is the function of lost motion 29 to delay the rotation of gear 27 in the direction of arrow 25 during initial outward reciprocation of slide 18 from the fully inward position of the slide. It is desirable to delay the rotation of gear 27 during the initial outward movement of slide 18 to prevent the unauthorized accumulation of timer run time by unscrupulous operators. Without the lost motion mechanism 29, it is possible for an operator to accumulate unauthorized timer run time by repeatedly reciprocating or ratcheting slide 18 inwardly and outwardly in small increments when slide 18 is near its fully inward position. By incorporating lost motion mechanism 29, ratcheting of slide 18 near its innermost position will not function to progressively advance timer-setting shaft 24 in the direction of arrow 25. Rather, gear rack 26 will not reciprocate outwardly until such time as a ratchet assembly (not shown) on the coin-receiving mechanism 15 will limit the movement of slide 18 to outward reciprocation.

Figure 4:
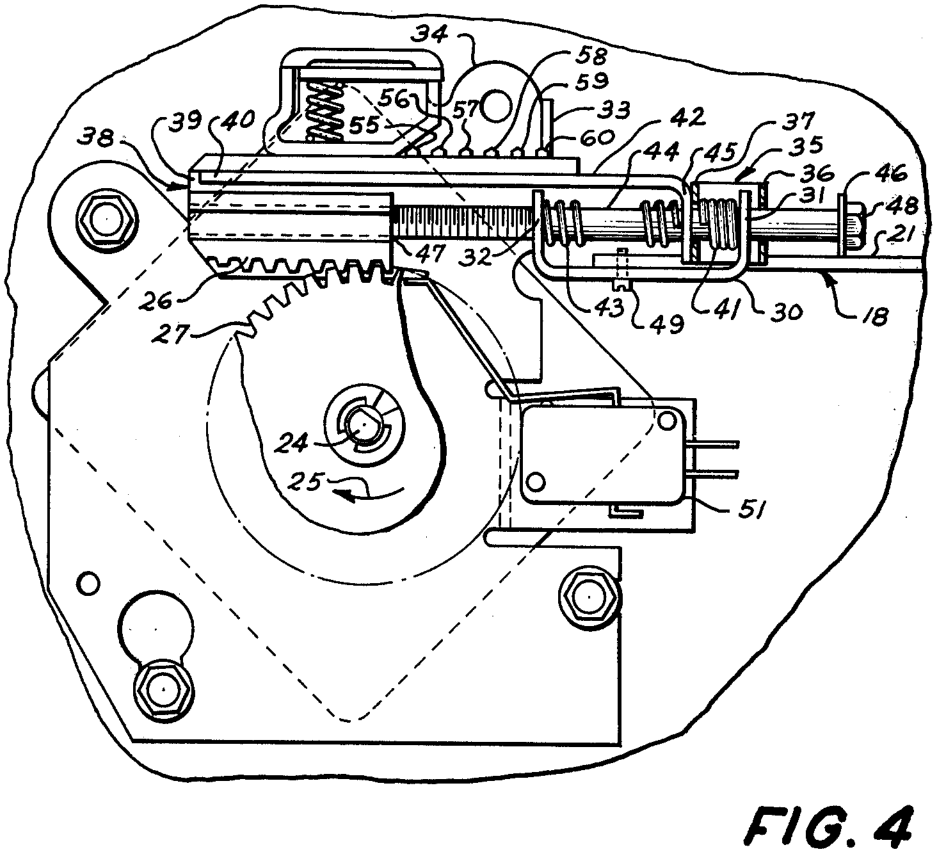
FIG. 4 is a partially enlarged view similar to FIG. 2 which the slide of the coin receiving mechanismextended fully inwardly.

With reference to FIGS. 2–4 lost motion mechanism 29 comprises an integrally plastic molded member 38 having gear rack 26 and grooves 39 formed longitudinally along each of two opposite sides for cooperation with arms 40 formed with carrier 42. Carrier 42 is movably connected to slide end 21 for reciprocation with slide 18, the details of which will be described later.

A biasing means in the form of spring 43 mounted coaxially on a follower 44 is operative to bias carrier 42 and member 38 to the first position of FIG. 2. It will be seen that follower 44 passes through a downturned flange 45 of carrier 42 which is adapted to engage spring 43. A U-shaped connector member 30 attached to slide 18 by fastener 49 has the follower 44 passing through apertures in both legs 31 and 32 of the U-shaped connector member 30. It will be noted that the spring 43 has stops at each end thereof, one consisting of the downturned flange 45 of carrier 42, and the other the upturned flange 32 of the connector member 30 and that the member 38 and connector member 30 may move longitudinally relative to each other.

In cooperative association with this lost motion mechanism there is provided a mechanism for automatically compensating for deviations in manufacturing tolerance assembly which includes an upstanding flange member or tang 33 formed as part of carrier 42. The vertical tang 33 is rigid so that it provides a positive forward motion stopping means by abutting a stationary member a predetermined distance from the timer gear, such as the timer mounting bracket 34, to prevent all further inwardly movement of member 38 and the rack 26 carried thereby. To compensate for variance in manufacturing assembly tolerance of one mechanism versus another there is provided automatic means for adjusting the assembly and specifically the amount of inward movement of rack 26 that could vary due to the assembly tolerance differences. To this end, there is provided the mechanism located to the rear of the lost motion mechanism 29. This automatic compensating mechanism consists of a four sided bracket 35 having the follower 44 passing through two of the sides to retain the bracket 35 coaxially on the follower 44. Leg 31 of connector member 30 through which follower 44 also passes is located between the ends 36 and 37 of bracket 35. Located coaxially on follower 44 is a coil spring 41 which has one end thereof in abutment with leg 31 of the connector member 30 and the other end thereof in abutment with bracket end 37 and is thereby captured between these two elements. The amount of compression of spring 41 will depend upon and is determined by the amount of manufacturing tolerance deviations that is wished to be compensated for. By the construction of this mechanism any such manufacturing tolerance deviation is automatically compensated for while the rack 26 is positively stopped and prevented from any forward movement. Moreover, it is stopped at the same position as compared to all the manufactured accumulator assemblies for a given amount of set time. Follower 44 is secured to member 38 by means of a threaded connection 47. By means of a hex nut 48 the follower 44 may be screwed in and out of member 38 thereby providing means for adjusting the position of member 38 and thereby gear rack 26 relative to slide 18. As explained in the aforementioned Zinninger and Harris patents, by adjusting the position of gear rack 26 relative to slide 18, the length of engagement of the gear rack 26 with gear 27, and hence the amount of timer run time accumulated per coinage deposit is selectively adjustable.

As may be seen best in FIG. 4, member 38 is formed of suitable plastic material and includes an upper surface that has a plurality of upstanding ribs 55, 56, 57, 58, 59 and 60 formed on the top surface thereof in a direction perpendicular to the path of reciprocation of the slide 18. It is the function of these ribs to provide an indication of the position of member 38 and rack 26 relative to slide 18 and to gear 27 as is determined by the adjustment of threaded connection 47. In FIG. 4, slide 18 is in its fully inward position and member 38 is positioned relative thereto so as to align rib 60 with upstanding tang 33. Alignment of rib 60 with upstanding tang 33 when slide 18 is fully inward indicates that during the outward travel of slide 18, a given amount of time of timer run time will be accumulated on the timer mechanism. Similarly, alignment of ribs 55, 56, 57, 58, or 59 with upstanding tang 33 when slide 18 is fully inward will result in the accumulation of less time, respectively, during outward movement of slide 18. By this means there is provided an adjustment for the amount of timer run time to be accumulated per coinage deposit.

Figure 5:
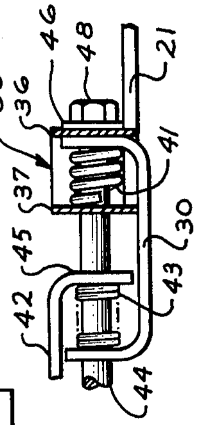
FIG. 5 is a view similar to FIG. 4 showing a portion of the invention mechanism with the slide of the coin receiving mechanism being withdrawn.

In operation, after the operator has made the desired cycle selection by means of buttons 14 and has placed the proper coinage into the coin receiving mechanism 15, slide 18 may be reciprocated inwardly from the position of FIG. 2 and 3 to the position of FIG. 4. During such inward reciprocation, gear rack 26 engages gear 27 rotating it in the direction opposite arrow 25. During such rotation, undirectional clutch 28 transmits no motion to the timer setting shaft 24. The forward movement or reciprocation of gear rack 26 is positively stopped by upstanding tang 33 abutting timer mounting bracket 34. Any manufacturing tolerance deviation will be compensated for after such abutment by spring 41 being compressed with the tolerance difference being the distance between leg 31 of connector member 30 and bracket end 36 of the bracket 35. By this arrangement then the tolerance deviation in the entire assembly is compensated for automatically yet the gear rack 26 is positioned positively at a set distance from the upstanding tang 33. Subsequent outward reciprocation of slide 18 will cause no motion of member 38 which remains in the fully inward position until such time as bracket end 36 moves along follower 44 rearwardly and abuts up against flange 46 at the rear of the follower as shown in FIG. 5. At this time gear rack 26 and member 38 (FIG. 4) will move outwardly with slide 18 causing rotation of gear 27. When gear rack 26 is moved outwardly sufficiently to disengage gear 27, spring 43 re-extends, snapping member 38 and gear rack 26 forward until such time as downturned flange 45 of carrier 42 abuts up against end 37 of bracket 35.

As will be evident from the foregoing description, certain aspects of the invention are not limited to the particular details of construction of the examples illustrated, and it is contemplated that other modifications, applications or variations will occur to those skilled in the art. It is therefore intended to cover such modifications, applications and variations as do not depart from the true spirit and scope of the invention.

What is claimed is:

1. In a time accumulating means adapted to accumulate timer run time on a timer mechanism in response to an outward reciprocation of the slide of a coin-receiving mechanism from a fully inward position, wherein the time accumulating means rotates the setting shaft of said timer mechanism unidirectionally in response to an inward and outward reciprocation of the slide and comprises the elements of a gear rack associated with the slide for reciprocation therewith, a gear rotatably positioned to engage the gear rack during at least a portion of the outward reciprocation, and a unidirectional clutch connecting the gear and the setting shaft; the improvement comprising mechanism means including a member that is stationary relative to the slide and a member movable with the gear rack, said members cooperating by abuttment with each other to positively stop inward movement of the gear rack at a predetermined position relative to the timer gear, and resilient means between the gear rack and slide cooperating with the stationary and movable members after abuttment thereof to take up mechanism assembly tolerances without further inward movement of the gear rack.

2. The time accumulating means of claim 1 wherein the resilient means permits restricted relative movement between the slide and the gear rack.

3. The time accumulating means of claim 1 wherein the mechanism means to positively stop inward movement of the gear rack is a rigid tang on a carrier that has secured thereto the gear rack, said tang arranged to abut a stationary member a predetermined distance from the timer gear.

4. The time accumulating means of claim 1 wherein a lost motion mechanism is incorporated to delay rotation of the timer gear during initial outward reciprocation of the slide.

5. The time accumulating means of claim 1 wherein means are provided for manually selectively setting the predetermined distance from the gear rack to the member movable with the gear rack.

6. The time accumulating means of claim 4 wherein the coin receiving mechanism includes movement restricting means operable after an initial amount of outward reciprocation of the slide from the fully inward position to prevent subsequent inward reciprocation of the slide, said lost motion mechanism being operable after the movement restricting means becomes operable.

* * * * *